United States Patent
Mett et al.

(10) Patent No.: US 7,879,435 B2
(45) Date of Patent: Feb. 1, 2011

(54) HOLLOW CHAMBER STRUCTURAL COMPONENT AND METHOD FOR PRODUCING SAME

(75) Inventors: Thomas Mett, Döhlau (DE); Peter Michel, Hof (DE); Claus-Christian Steeg, Oelsnitz (DE)

(73) Assignee: Rehau AG & Co., Rehau (DE)

( * ) Notice: Subject to any disclaimer, the term of this patent is extended or adjusted under 35 U.S.C. 154(b) by 831 days.

(21) Appl. No.: 11/826,326

(22) Filed: Jul. 13, 2007

(65) Prior Publication Data
US 2008/0014388 A1 Jan. 17, 2008

(30) Foreign Application Priority Data
Jul. 14, 2006 (DE) .................. 10 2006 032 867

(51) Int. Cl.
 B32B 3/00 (2006.01)
 B32B 3/12 (2006.01)
 B32B 3/20 (2006.01)
 B60N 3/00 (2006.01)
 B60J 7/00 (2006.01)
(52) U.S. Cl. .................. 428/166; 428/178; 428/188; 428/72; 296/187.03; 296/187.11; 52/795.1
(58) Field of Classification Search .................. 428/72, 428/73, 166, 178, 188; 296/187.02, 187.03, 296/187.13, 187.11, 187.12, 203.02, 203.04, 296/203.03; 180/89.1; 52/795.1, 784.16, 52/834, 783.1, 783.14, 783.17
See application file for complete search history.

(56) References Cited

U.S. PATENT DOCUMENTS 6,003,274 A * 12/1999 Wycech .................. 52/232

FOREIGN PATENT DOCUMENTS

| DE | 82 25 654 U1 | 9/1982 |
| DE | 38 39 855 A1 | 5/1990 |
| DE | 43 15 688 A1 | 11/1994 |
| DE | 101 43 564 A1 | 3/2003 |

OTHER PUBLICATIONS

German Patent and Trademark Office Search Report, dated Jan. 15, 2007, issued for related German Application No. 10 2006 032 867.1, and partial translation.

German Patent and Trademark Office Search Report, dated Jul. 14, 2006, issued for related German Application No. 10 2006 032 867.1, and partial translation.

* cited by examiner

*Primary Examiner*—David R Sample
*Assistant Examiner*—Catherine Simone
(74) *Attorney, Agent, or Firm*—Venable LLP; Robert Kinberg; Ryan M. Flandro

(57) ABSTRACT

A hollow chamber structural component includes a shell component which extends along a main extension direction. A cover component is attached to the shell component, wherein a hollow chamber is disposed between the shell component and the cover component and extends in the main extension direction. A reinforcing structure is arranged in the hollow chamber and comprises: a synthetic support structure, which follows at least in some sections the main extension direction and rests with at least some sections against an inside of the shell component; and at least one reinforcing element that follows at least in some sections the main extension direction and is joined to the synthetic support structure with the aid of a layer of adhesive.

2 Claims, 2 Drawing Sheets

HOLLOW CHAMBER STRUCTURAL COMPONENT AND METHOD FOR PRODUCING SAME

CROSS-REFERENCE TO RELATED APPLICATION

This application claims the priority of German Patent Application No: 102006032867.1, filed on Jul. 14, 2006, the subject matter of which is incorporated herein by reference.

BACKGROUND OF THE INVENTION

The invention relates to a hollow chamber structural component comprising a shell component, which extends along a main extension direction; and a cover component that is attached to the shell component.

A hollow chamber structural component of this type is known from German Patent Application 38 39 855 C2, wherein this structural component has sufficient bending and/or torsion resistance only if the shell component meets specific cross-sectional requirements. Especially in the field of automobile production, design requirements increasingly call for shell components that have cross sectional areas with negligible inherent rigidity and thus a low mechanical load carrying capacity. A design using hollow chamber elements of the known type therefore does not meet typical load requirements.

SUMMARY

It is an object of the present invention to improve a hollow chamber structural component of the aforementioned type, such that a hollow chamber structural component with high mechanical load carrying capacity is produced, even if the shell component has unfavorable cross sections.

The above and other objects are achieved according to the invention wherein there is provided a hollow chamber structural component which, in one embodiment, comprises: a shell component, which extends along a main extension direction; a cover component that is attached to the shell component, wherein a hollow chamber is disposed between the shell component and the cover component and extends in the main extension direction; and a reinforcing structure arranged in the hollow chamber and comprising: a synthetic support structure, which follows at least in some sections the main extension direction and rests with at least some sections against an inside of the shell component; and at least one reinforcing element that follows at least in some sections the main extension direction and is joined to the synthetic support structure with the aid of a layer of adhesive.

A reinforcing structure as described above can be produced with little expenditure by joining a stiffening element with the aid of an adhesive agent to a support structure made from synthetic material. The resulting reinforcing structure guarantees a high load carrying capacity for a hollow chamber structural component, even if the shell component itself has unfavorable cross sectional areas. The reinforcing structure in particular ensures a high bending and torsion resistance for the hollow chamber structural component, wherein different types of material can also be used for the shell component such as steel, aluminum or magnesium.

A fabric-reinforced thermoplastic composite that is also referred to as an organic sheet material can furthermore be used for the shell component. The shell component can also be produced from prepreg (pre-impregnated glass fiber material), meaning from a semi-finished product with a duroplastic fiber matrix, in particular a continuous fiber reinforced duroplastic semi-finished product. In addition, the shell component can be produced from various other semi-finished products with a fiber matrix, such as BMC (bulk molding compound) or SMC (sheet molding compound).

According to one embodiment, the reinforcing element is made from a reinforcing sheet metal strip which can be produced cost-effectively while simultaneously having a high load carrying capacity. Materials that can be used for the reinforcing element include, for example, steel, aluminum or magnesium. For example, a reinforcing strip of flat steel may be used for the reinforcing element.

In one embodiment, there is provided a reinforcing element with at least one mounting section which makes it possible to join the shell component and the cover component and, if applicable, additional peripheral components, without having to provide additional synthetic material elements on the structural components.

According to further embodiments, the synthetic support structure may be made from reinforced polyamide or glass fiber-reinforced polypropylene, which have proven useful for the production of a hollow chamber structural component and additionally form a good basis for an adhesive agent that adheres well to the reinforcing element.

It is additionally an object of the present invention to provide a method for an efficient production of a hollow chamber structural component.

Thus, according to this aspect of the invention, there is provided a method for producing a hollow chamber structural component as defined above, which, in one embodiment, comprises: providing a mold for an injection molding process; inserting the reinforcing element, coated with adhesive, into the injection mold; injection molding the synthetic support structure with the aid of the injection mold to form the reinforcing structure; inserting the reinforcing structure into the shell component; and attaching the cover component to the shell component.

Thus, with the production method according to the invention, the reinforcing element is inserted into the injection mold and is joined to the synthetic support structure during the injection-molding process. The connection of the reinforcing element to the synthetic support structure consequently does not require a separate operating step.

According to a further embodiment of the method, the reinforcing element is extrusion-coated, at least in some sections, during the injection molding of the synthetic support structure, which increases the intrinsic stability of the reinforcing structure in dependence on the direction. The synthetic support structure, joined material-to-material with the aid of an adhesive agent to the reinforcing element, essentially has a safeguarding function.

BRIEF DESCRIPTION OF THE DRAWINGS

These and other features and advantages of the invention will be further understood from the following detailed description of embodiments of the invention, with reference to the accompanying drawing.

DETAILED DESCRIPTION

Figure 1:
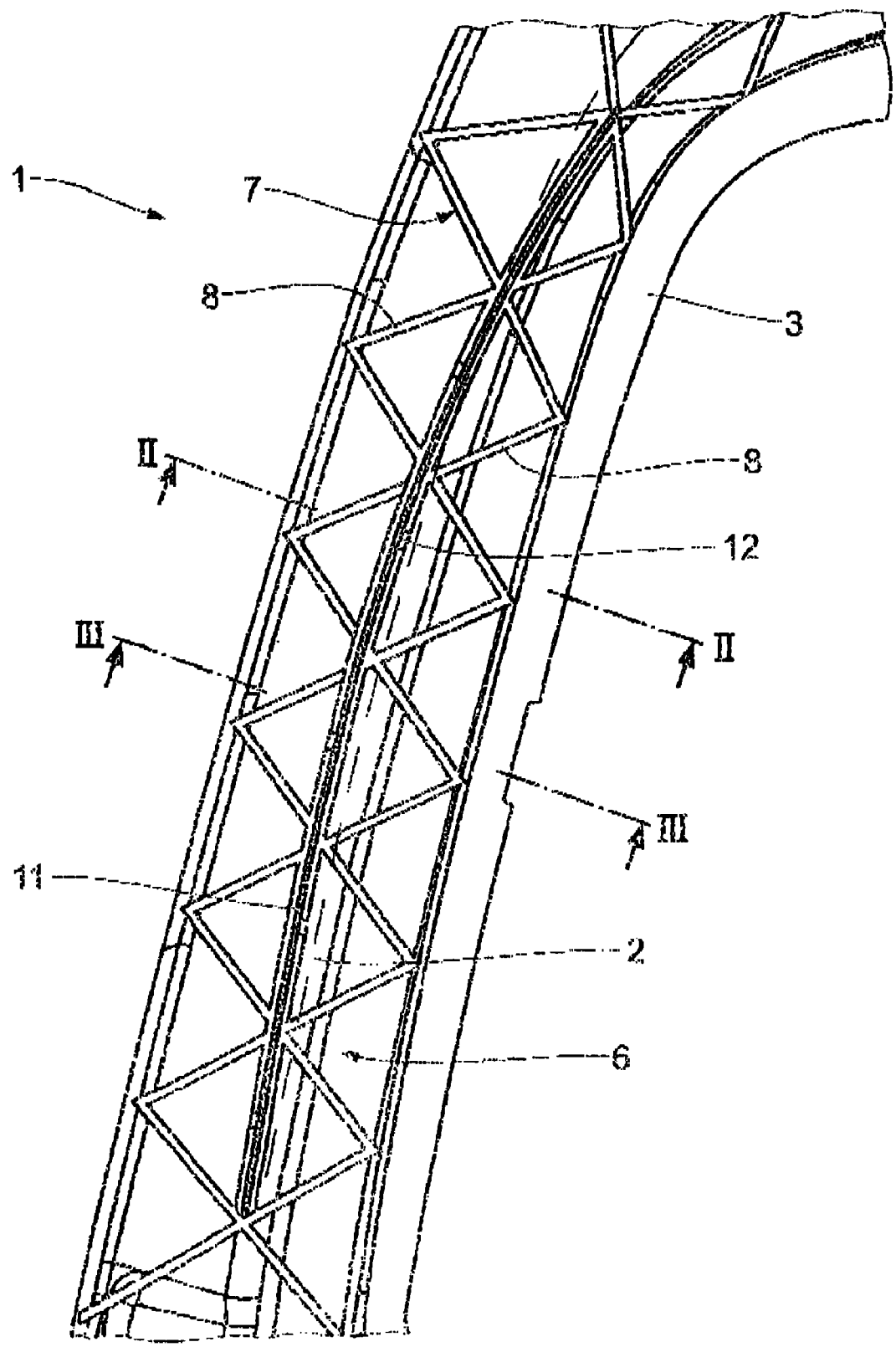
FIG. 1 is a view from the side of a section of a hollow chamber structural component without the cover component.

FIG. 1 shows details of the main sections of a hollow chamber structural component 1, which may be used as a frame structure for a motor vehicle tail gate made of synthetic material, wherein the hollow chamber structural component 1 can also be used for a front-end support.

The hollow chamber structural component 1 comprises a shell component 3, which extends along a main extension direction 2, indicated with dashed lines in FIG. 1. The shell component may be a sheet metal profile section. However, the shell component may also be produced from other materials such as steel, aluminum, or magnesium. The shell component may also be made of a different type of material comprising a fabric-reinforced thermoplastic material composite, also called an organic sheet material. The shell component can furthermore be produced from pre-impregnated glass fiber material (prepreg), meaning from a semi-finished product with a duroplastic fiber matrix, in particular a semi-finished product with continuous fiber-reinforced duroplastic. The shell component can also be produced from different semi-finished products with a fiber matrix, such as BMC (bulk molding compound) or SMC (sheet molding compound). If this component is used for a tail gate of synthetic material, the main extension direction 2 is around the tail gate opening.

Figure 2:
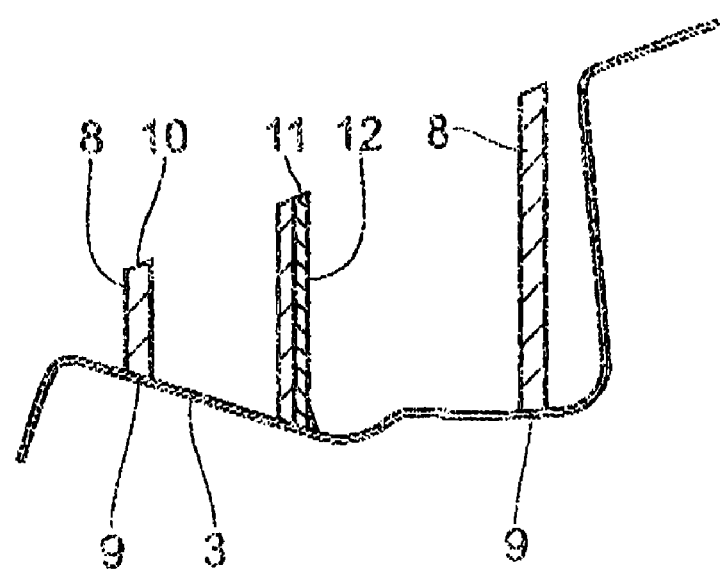
FIG. 2 is a sectional view along line II-II in FIG. 1.
Figure 3:
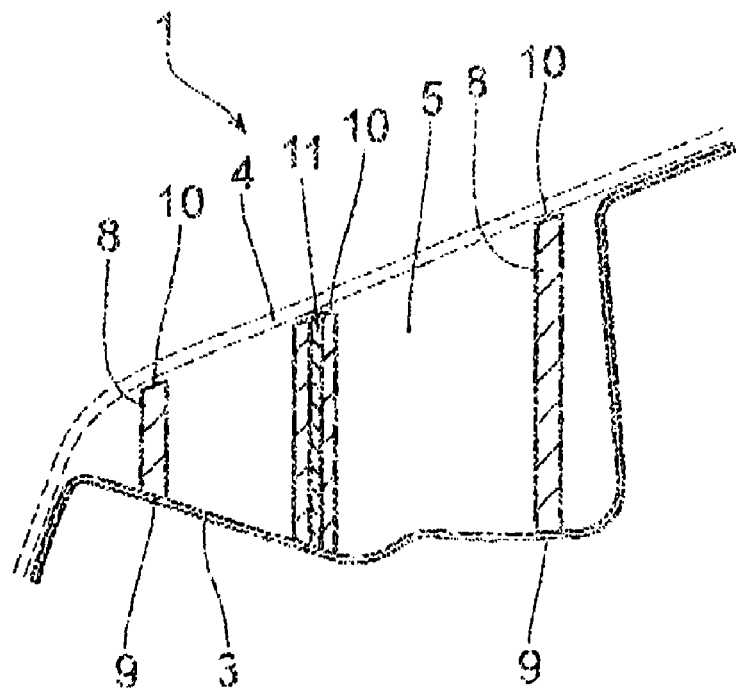
FIG. 3 is another sectional view along line III-III in FIG. 1.

A cover component 4, not shown in FIGS. 1 and 2, and only indicated with dashed lines in FIG. 3, is attached to the shell component 3, for example by screwing it on or snapping it into the shell component 3.

A hollow chamber 5 that follows the main extension direction 2 is formed between the shell component 3 and the cover component 4 and functions to accommodate a reinforcing structure 6, which serves in particular to increase the bending resistance of the hollow chamber structural component 1.

The reinforcing structure 6 comprises a synthetic support structure 7, which follows the main extension direction 2 and is provided with several reinforcing ribs 8, extending in a zigzag pattern along the main extension direction 2. The synthetic support structure 7 is composed of reinforced polyamide (PA). Other types of synthetic material can also be used for this support structure, for example glass fiber-reinforced polypropylene (PP), wherein the use of long glass fibers is preferred. The support structure 7 of synthetic material rests via the edge sections 9 of the reinforcing ribs 8 on the inside against the shell component 3, while the reinforcing ribs 8 rest via additional edge sections 10 on the inside against the cover component 4.

A reinforcing element 11, that follows the main extension direction 2 and may be embodied as a reinforcing strip of flat steel, is arranged between the two reinforcing ribs 8 that extend in a zigzag pattern. Other materials that can be used for the reinforcing element include metals such as steel, aluminum, or magnesium.

A different type of material for the reinforcing element may be a fabric-reinforced thermoplastic compound, also called an organic sheet material. The reinforcing element may also be produced from prepreg, meaning from a semi-finished product with a duroplastic fiber matrix, in particular a continuous fiber-reinforced duroplastic semi-finished material, wherein semi-finished products with a different fiber matrix can also be used, such as BMC (bulk molding compound) or SMC (sheet molding compound).

The reinforcing element 11 may be joined to the adjacent reinforcing ribs 8 with a layer of adhesive that is not shown in the drawing. The reinforcing element 11 ensures that the hollow chamber structural component 1 has a high mechanical load carrying capacity, in particular a high bending resistance, despite the relatively low inherent rigidity of the shell component 3 and the cover component 4.

The reinforcing element 11 can be provided with a mounting section for attaching the synthetic support structure 7 to the shell component 3 and/or the cover component 4. The mounting section can be a screw thread, or an eyelet, or a bracket, wherein snap-on sections can also be provided on the reinforcing structure.

The hollow chamber structural component 1 is produced as follows:

For the injection-molding process, a mold is initially provided into which the reinforcing element 11 that is coated with a layer of adhesive is inserted. To keep the reinforcing element 11 in place, the injection mold can contain alternating holding pins, which hold the reinforcing element 11 in place between them. Following this, the support structure 7 is created from a synthetic material and with the injection-molding technique. During the injection-molding process, recesses are left in the reinforcing element 11, at the location of the holding pins. FIG. 2 shows a section through a hollow chamber structural component 1 without cover component 4, at the location of such a recess 12.

During the injection molding process, the reinforcing element 11 with the reinforcing ribs 8 of the synthetic support structure 7 is extrusion coated in some sections. The synthetic support structure 7 together with the reinforcing element 11, produced in this way, subsequently forms the reinforcing structure 6 that is inserted into the shell component 3 and is attached thereto by using the mounting sections on the reinforcing element 11. Finally, the cover component 4 is attached to the shell component 3 and the reinforcing structure 6, thereby resulting in a hollow chamber structural component 1 with increased bending and torsion resistance, even if the bending and/or the torsion resistance of the shell component 3 or the cover component 4 is low.

It will be understood that the above description of the present invention is susceptible to various modifications, changes and adaptations, and that the same are intended to be comprehended within the meaning and range of equivalents of the appended claims.

What is claimed is:

1. A hollow chamber structural component, comprising
a shell component, which extends along a main extension direction;
a cover component that is attached to the shell component, wherein a hollow chamber is disposed between the shell component and the cover component and extends in the main extension direction; and
a reinforcing structure arranged in the hollow chamber and comprising:
a synthetic support structure, which follows at least in some sections the main extension direction and rests with at least some sections against an inside of the shell component; and
at least one reinforcing element that follows at least in some sections the main extension direction and is joined to the synthetic support structure with the aid of a layer of adhesive, wherein the synthetic support structure comprises a reinforced polyamide.

2. A hollow chamber structural component, comprising
a shell component, which extends along a main extension direction;
a cover component that is attached to the shell component, wherein a hollow chamber is disposed between the shell component and the cover component and extends in the main extension direction; and
a reinforcing structure arranged in the hollow chamber and comprising:

a synthetic support structure, which follows at least in some sections the main extension direction and rests with at least some sections against an inside of the shell component; and at least one reinforcing element that follows at least in some sections the main extension direction and is joined to the synthetic support structure with the aid of a layer of adhesive, wherein the synthetic support structure comprises a glass fiber-reinforced polypropylene.

* * * * *